Oct. 1, 1940. W. FRIEDRICHS Re. 21,586

COIN-CONTROLLED PREPAYING MACHINE FOR MAIL

Original Filed Nov. 21, 1934

Inventor:
W. Friedrichs
By: Glascock Downing & Seebold
Attys.

Reissued Oct. 1, 1940

Re. 21,586

UNITED STATES PATENT OFFICE 21,586

COIN-CONTROLLED PREPAYING MACHINE FOR MAIL

Wilhelm Friedrichs, Berlin-Reinickendorf-Ost, Germany

Original No. 2,101,615, dated December 7, 1937, Serial No. 754,137, November 21, 1934. Application for reissue March 30, 1938, Serial No. 199,032. In Germany April 23, 1930

14 Claims. (Cl. 194—19)

Figure 2:
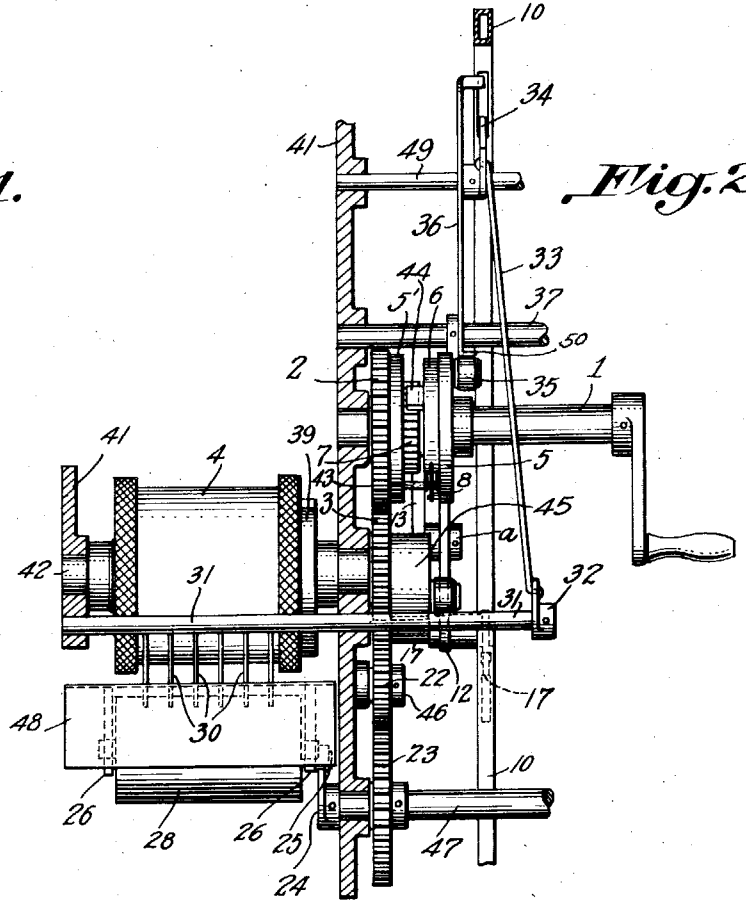

My invention relates to coin-controlled machines for prepaying mail, such as letters, post cards and other articles.

It is an object of my invention to provide an improved machine of the type referred to.

It is another object to provide mechanism which is controlled by the joint action of two elements, the letter and the coin to initiate a tripping operation and prepare the machine for a printing cycle of operation.

It is a further object to provide a trip mechanism which is adapted to be actuated by the engagement of a coin therewith.

Another object is to prevent the coin from completing a tripping operation after it is inserted until a letter is also inserted in the machine.

Another object is to provide means whereby a second letter is prevented from being inserted while operation upon the first letter is in progress.

In general the controlling mechanism comprises a coin stop which is adapted to prevent the advancement of the coin to a tripping position until the stop is removed from the path of the coin. Associated with said coin stop is an obstruction member or gate which is normally positioned in the path of the letter and which has a connection with the stop, such that when the letter is inserted in the machine, its engagement with the gate will effect a movement of the coin stop to thereby release the coin and consequently effect a tripping operation.

By means of the combined gate and coin stop a machine operation will only result after both a coin and letter are inserted, also a coin could not be received by the machine without eventually effecting a machine operation.

By these means the mechanism is secured against operation until a letter or the like is inserted in the machine. The machine cannot be operated before such insertion so that starting of the machine by throwing in a coin is prevented in the absence of mail, such as a letter, a post card, etc. This also prevents soiling of the impression cylinder by the printing cylinder which would occur if the two cylinders were moved into operative relation without being separated by the article the printing cylinder prints on.

Associated with said gate is also a device for obstructing the movement thereof while one letter is being operated upon during a printing cycle of machine operation.

In the accompanying drawing, a machine embodying my invention is illustrated by way of example.

Figure 1:
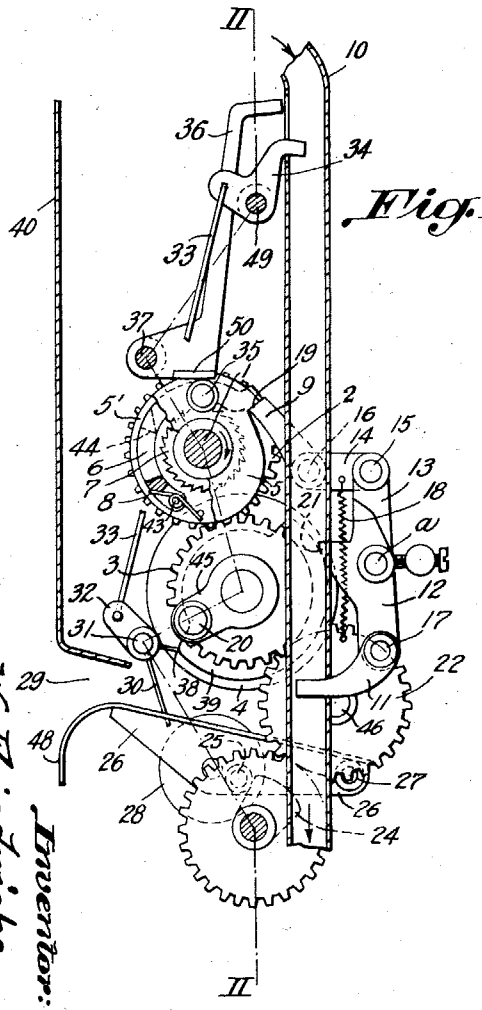

In the drawing:

Fig. 1 is an elevation of the machine, in section on the central plane of its coin chute, and Fig. 2 is a section on the line II—II in Fig. 1.

Referring now to the drawing, the machine is equipped with a casing 40 partly shown in Fig. 1, and with a frame 41 partly shown in Fig. 2. 10 is its coin chute, and 29, Fig. 1 is a slot in the front wall of casing 40 for inserting articles to be mailed, such as letters, postcards, etc.

The driving shaft 1, here shown as a crank shaft, is mounted in the frame 41. A clutching member is mounted to turn freely on the driving shaft 1, said clutching member including a spur gear 2, and a pair of spaced end plates 5 and 5' rigidly connected to the spur gear 2. The end plates 5 and 5' are connected by a pin 43. The spur gear 2 meshes with another spur gear 3 on the shaft 42 of a printing cylinder 4. A pawl 6 is pivoted to the end plate 5 at 43. The end plate 5 is shown partly broken away in Fig. 1 to expose the pawl 6. The pawl has a ratchet tooth 44 which projects from its rear face, i. e., the face which is opposite the end plate 5', and is adapted to engage in the teeth of a ratchet wheel 7. The ratchet wheel is positively connected to the driving shaft 1 and rotates with the shaft.

A spring 8 on the pivot 43 of pawl 6 tends to throw the tooth 44 in engagement with the teeth of ratchet wheel 7 but the tooth 44 is held disengaged from the teeth of wheel 7 by the engagement of a check 9 with the free end of the pawl 6, said check 9 being fulcrumed in the frame at 16. In the position illustrated, the check 9 also engages a step 19 on the end plate 5 on which the pawl 6 is pivotally mounted, as described. The check 9 is part of a bellcrank, and a spring 18 is connected to the other arm 14 of the bellcrank. A link 13 is pivotally connected to the free end of arm 14 at 15, and to the arm 12 of another bellcrank at *a*. The other bellcrank is fulcrumed in the frame of the machine at 17. Its shorter arm 11, in the position illustrated, projects into the coin chute 10, and its longer arm 12 is equipped with a cam 21 projecting into the path of a camming roller 20 at the free end of an arm 45 on the shaft 42 of printing cylinder 4.

The spur gear 3 on the shaft 42 meshes with a spur gear 22 on a lay shaft 46 and this spur gear, in turn meshes with a spur gear 23 on a cam shaft 47. The cam shaft which is mounted in the frame 41, supports a cam 24 for cooperation with a lug 25 on the frame 26 of a table 48 for the reception of the articles. The table 48 is fulcrumed at 27 and supports an impression cylinder 28.

A gate, or grate 30, which is mounted on a shaft 31, projects into the slot 29, Fig. 1, with its lower free end bearing on table 48. An arm 32 on the shaft 31 is connected by a link 33, to one arm of a coin stop 34 which is fulcrumed at 49 and whose other arm projects into the coin chute 10 when the gate 30 bears on the table 48, as shown.

An angular lever 36 is fulcrumed above the driving shaft 1 at 37 and, in the position illustrated, a lug 50 thereon rests on a roller 35 which is secured to end plate 5. The upper end of angular lever 36 is adapted to enter the coin chute 10 under certain conditions, as will be described.

38 is an arm, preferably of elastic material, which is secured to the gate shaft 31 in line with a cam 39 at one side of the printing cylinder 4.

The operation of my machine is as follows:

In the position of parts illustrated, the upper end of angular lever 36 clears the coin chute 10, and coin stop 34 projects into the chute. When a coin is inserted, it is arrested by the coin stop 34 until an article is inserted in the slot 29 and pushes aside the gate 30. The movement of gate 30 is transmitted to the coin stop 34 through link 33, the stop is retracted and the coin descends in the chute, where it strikes the arm 11, and finally is delivered to a collector, not shown. The link 13 and the long arm of lever 11, 12 form a sort of toggle which is normally straight. While it is so, the spring 18 is without influence but, when a coin strikes arm 11, the arm is lowered, the toggle joint is broken, and the spring 18 moves the check 9 out of the way of pawl 6 and of step 19 so that the pawl now engages in the teeth of ratchet wheel 7 under the action of spring 8, and the shaft 1, which formerly could be rotated freely, now imparts rotation to the mechanism by which the printing cylinder 4 is rotated. The ratchet wheel 7 is rigidly secured to the shaft 1, and hence upon rotation of the latter in a clockwise direction, the teeth on said ratchet wheel will engage the tooth 44 of the pawl 6, which has been released by the coin-controlled lever 9. Consequently, the pawl, together with plates 5 and 5′ and the spur wheel 2 rigidly secured thereto, participate in this clockwise rotation and operate the printing drum or cylinder 4. Movement of the crank in opposite direction may be prevented by any suitable means old in the art and therefore not disclosed. As the driving shaft rotates in the proper direction, i. e., clockwise, the lug 50 of angular lever 36 is released by the roller 35 of end plate 5, and the free end of the lever closes the chute 10 so that no coin can be inserted while the machine performs its cycle. The cam 39 is of such length that it contacts the elastic arm 38 only during the last half of the revolution of the printing drum, at which time it cooperates with the arm 38 to resist the raising of gate 30 by an article, but not to such an extent as to damage the article which is inserted before it is time. Cam 24 on shaft 47 which, as shown in Fig. 1, is partly concentric, raises the table 48 and the impression cylinder 28 toward the printing cylinder 4, and, during the cycle, the camming roller 20 on arm 45 engages the cam 21 on the longer arm 12, and straightens the toggle, placing the machine in readiness for the next cycle. The article, upon entering the machine, pushes the gate 30 aside to retract the stop 34 from the chute 10. However, after the article has passed beyond the gate, where it receives the desired printing impression from the printing cylinder 4, the gate then swings back to its normal closed position, shown in Fig. 1, thereby causing the stop 34 to return into its blocking position in the chute 10. The table 48 is released by cam 24 and, with the impression cylinder 28, returns into its initial position. The roller 35 moves the free end of angular lever 36 out of the chute 10, and a coin which has been intercepted by the lever, now descends as far as stop 34 where it waits for the next movement of gate 30.

It will appear that the machine according to my invention is entirely foolproof, as its operation is not interfered with by insertion of too many coins at a time, nor by insertion of another article before the one that is in the machine has been printed and that damage to an article thus inserted is prevented by the elasticity of arm 38.

I claim:

1. In a coin-controlled prepaying machine for mail, a printing member, coin controlled mechanism for operating said printing member, a coin chute for conducting coins to said mechanism, a gate adapted to be moved by an article to be mailed, and means operatively connected to said gate for retaining a coin inserted in said chute and adapted to be rendered inoperative upon movement of the gate by an article to be mailed.

2. In a coin-controlled prepaying machine for mail, a printing member, coin controlled mechanism for operating said printing member, a gate adapted to be moved by an article to be mailed, a coin chute, a stop projecting into said coin chute for retaining a coin therein, and means operatively connected to said gate for retracting said stop when said gate is moved by such article.

3. In a coin-controlled prepaying machine for mail, a casing, a movable table defining, with said casing, a slot for inserting articles to be mailed, a printing member, coin controlled mechanism for operating said printing member, an impression cylinder on said table, means operatively connected to said mechanism for reciprocating said table and presenting the impression cylinder to the printing member, a gate pivotally arranged in said casing so as to bear on said table with its free end and to close said slot, a coin chute, a stop projecting into said coin chute for retaining a coin therein, and means operatively connecting said gate to said stop, for retracting said stop when said gate is raised from said table by an article inserted in said slot on said table.

4. In a coin-controlled prepaying machine for mail, a printing member, coin-controlled mechanism for operating said printing member, a coin chute for conducting coins to said mechanism, a gate adapted to be moved by an article to be mailed, means operatively connected to said mechanism for holding said gate against movement while the mechanism is in operation, and means operatively connected to said gate for retaining a coin inserted in said chute and adapted to be rendered inoperative upon movement of the gate by an article to be mailed.

5. In a coin-controlled prepaying machine for mail, a printing member, coin-controlled mechanism for operating said printing member, a coin chute for conducting coins to said mechanism, a gate adapted to be moved by an article to be mailed, a cam which is operatively connected to said mechanism and whose length corresponds to the period for which said mechanism is in operation, an arm which is operatively connected to said gate and controlled by said cam, for holding said gate against movement during the said period, and means operatively connected to said gate for retaining a coin inserted in said chute and adapted to be rendered inoperative upon movement of the gate by an article to be mailed.

6. In a coin-controlled prepaying machine for mail, a printing member, coin-controlled mechanism for operating said printing member, a coin chute for conducting coins to said mechanism, a gate adapted to be moved by an article to be mailed, a cam which is operatively connected to said mechanism and whose length corresponds to the period for which said mechanism is in operation, an elastic arm which is operatively connected to said gate and controlled by said cam, for holding said gate against movement during the said period, and means operatively connected to said gate for retaining a coin inserted in said chute and adapted to be rendered inoperative upon movement of the gate by an article to be mailed.

7. In a coin-controlled prepaying machine for mail, a printing member, a driving mechanism for said printing member, coupling means for operatively connecting said driving mechanism and said printing member, controlling means for said coupling means, said controlling means being actuated by a coin, a gate adapted to be moved by an article to be mailed, a coin chute, a stop projecting into said coin chute for retaining a coin therein before having acted upon said controlling means, and means operatively connected to said gate for retracting said stop when said gate is moved by such article.

8. In a coin-controlled prepaying machine for mail, a printing member, coin-controlled mechanism for operating said printing member, a coin chute for conducting coins to said mechanism, means for retaining a coin inserted in said chute, means operated by an article inserted in the machine for displacing and rendering said retaining means inoperative, and means operative by said mechanism for closing said chute against the insertion of a coin during the operation of the machine.

9. In a coin-controlled prepaying machine for mail, a printing member, driving mechanism for said printing member, coupling means for operatively connecting said driving mechanism and said printing member, coin actuated means for controlling said coupling means, coin retaining means for preventing actuation of said controlling means, and means controlled by an article inserted in the machine for rendering said coin retaining means inoperative.

10. In a coin controlled prepaying machine for printing a value stamp impression upon letters, the combination with a value stamp printing member, coin receiving means, letter receiving means, and a drive means; of coin retaining means, coin controlled tripping means to connect the drive means and the printing member, and a letter controlled means having a connection with the retaining means, said letter controlled means and coin retaining means being jointly operable upon inserting a letter in the letter receiving means to release a coin for passage to said coin controlled tripping means.

11. In a coin controlled prepaying machine for printing a value stamp impression upon letters, the combination with a value printing member, coin receiving means, letter receiving means and a drive means for the printing member normally disconnected therefrom of means adapted to connect the drive means with the printing member, a coin controlled trip mechanism associated with said connecting means adapted to be operated by a coin inserted in said coin receiving means, means to obstruct the passage of a coin to the trip mechanism through the receiving means and a letter controlled device connected with the obstructing means and movable to release the obstructing means when a letter inserted in the letter receiving means engages and operates the letter controlled device.

12. In a coin controlled prepaying machine for printing a value stamp impression upon letters, the combination with a value printing member, coin receiving means, letter receiving means, and a drive means for the printing member normally disconnected therefrom; of means adapted to connect the drive means with the printing member, a coin actuated tripping mechanism associated with said connecting means adapted to be operated by a coin inserted in said coin receiving means, means to obstruct the passage of a coin to the trip mechanism through the receiving means, a letter controlled device including a gate movably mounted within and normally extended across the path of the letter receiving means, means adapted to yieldably retain the letter controlled device in an obstructing position during the latter part of a printing cycle of operation, and means operable by the letter controlled device and movable to release the coin obstructing means during the first part of the cycle and when a letter inserted in the letter receiving means engages and operates the letter controlled device.

13. In a coin controlled prepaying machine for printing a value stamp upon letters inserted therein, a value printing member, a clutch controlled drive for said value printing member, said drive being normally disengaged, a coin controlled device operable to cause engagement of said drive, means to obstruct the passage of a coin to the coin controlled device, and a letter controlled device connected with the obstructing means and movable to release the obstructing means when a letter inserted in the machine engages and operates the letter controlled device.

14. In a coin controlled prepaying machine for printing a value impression upon letters, a value printing member, coin guiding means, letter receiving means, drive means normally disconnected from the printing member, coin controlled means operative upon engagement of a coin therewith to effect a connection between the drive means and printing member, means to normally prevent passage of a coin through the guiding means, and means rendered operable by the introduction of a letter in the letter receiving means to render the passage preventing means ineffective whereby the coin may pass through the guiding means and thereby engage said coin controlled means.

WILHELM FRIEDRICHS.